United States Patent
Pouli et al.

(10) Patent No.: US 9,911,181 B2
(45) Date of Patent: Mar. 6, 2018

(54) METHOD FOR INVERSE TONE MAPPING OF AN IMAGE

(71) Applicant: THOMSON LICENSING, Issy les Moulineaux (FR)

(72) Inventors: Tania Pouli, Chateaugiron (FR); Erik Reinhard, Cesson-Sevigne (FR); Christel Chamaret, Chantepie (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 15/108,562

(22) PCT Filed: Dec. 2, 2014

(86) PCT No.: PCT/EP2014/076183
§ 371 (c)(1),
(2) Date: Jun. 27, 2016

(87) PCT Pub. No.: WO2015/096955
PCT Pub. Date: Jul. 2, 2015

(65) Prior Publication Data
US 2016/0328830 A1 Nov. 10, 2016

(30) Foreign Application Priority Data

Dec. 27, 2013 (EP) .................................... 13306876

(51) Int. Cl.
*G06K 9/00* (2006.01)
*G06T 5/00* (2006.01)
(Continued)

(52) U.S. Cl.
CPC ............ *G06T 5/007* (2013.01); *G06K 9/4661* (2013.01); *G06K 9/52* (2013.01); *G06T 5/008* (2013.01);
(Continued)

(58) Field of Classification Search
CPC ........ G06K 9/4661; G06K 9/52; G06T 5/007; G06T 5/008; G06T 7/90;
(Continued)

(56) References Cited

U.S. PATENT DOCUMENTS 6,731,823 B1 * 5/2004 Gallagher ............ H04N 1/4092
358/521
8,184,693 B2 * 5/2012 Chiu ...................... H04N 19/46
375/240.02
(Continued)

FOREIGN PATENT DOCUMENTS

WO      WO2010132237      11/2010

OTHER PUBLICATIONS

Banterle et al., "Inverse Tone Mapping", Proceedings of the 4th International Conference on Computer Graphics and Interactive Techniques in Australasia and Southeast Asia, Kuala Lumpur, Malaysia, Nov. 29, 2006, pp. 333-341.
(Continued)

*Primary Examiner* — Mekonen Bekele
(74) *Attorney, Agent, or Firm* — Jack Schwartz & Associates, PLLC (57) ABSTRACT

Method comprising, for each pixel, obtaining a pixel expansion exponent value (E'(p)) by low pass filtering luminance values of colors of pixels in its spatial neighborhood, obtaining a pixel luminance-enhancement value ($Y_{enhance}(p)$) by extraction of high frequencies of luminance values of colors of pixels in its spatial neighborhood, and then inverse tone mapping the luminance (Y(p)) according to the equation $Y_{exp}(p)=Y(p)^{E'(p)} \times [Y_{enhance}(p)]^c$.

19 Claims, 2 Drawing Sheets

(51) Int. Cl.
| | |
|---|---|
| *H04N 5/57* | (2006.01) |
| *H04N 21/431* | (2011.01) |
| *G06K 9/46* | (2006.01) |
| *G06K 9/52* | (2006.01) |
| *G06T 7/90* | (2017.01) |
| *H04N 5/235* | (2006.01) |

(52) U.S. Cl.
CPC ............... *G06T 7/90* (2017.01); *H04N 5/57* (2013.01); *H04N 21/4318* (2013.01); *G06T 2207/20024* (2013.01); *G06T 2207/20064* (2013.01); *G06T 2207/20208* (2013.01); *H04N 5/2355* (2013.01)

(58) Field of Classification Search
CPC . G06T 2207/20024; G06T 2207/20064; G06T 2207/20208; H04N 21/4318; H04N 5/57; H04N 5/2355
USPC .................. 382/165, 284; 348/229.1, 225
See application file for complete search history.

(56) References Cited

U.S. PATENT DOCUMENTS

| | | | |
|---|---|---|---|
| 8,289,412 | B2 | 10/2012 | Banterle et al. |
| 8,290,295 | B2* | 10/2012 | Criminisi ................. G06K 9/38 382/132 |
| 8,582,913 | B2 | 11/2013 | Rempel et al. |
| 9,020,257 | B2* | 4/2015 | El-Mandy ............... G06T 5/009 348/207.1 |
| 9,338,475 | B2* | 5/2016 | Chiu ....................... H04N 19/46 |
| 2008/0137976 | A1* | 6/2008 | Ward ...................... H04N 19/30 382/254 |
| 2012/0201456 | A1 | 8/2012 | El-Mahdy et al. |
| 2016/0352975 | A1* | 12/2016 | Kervec ................. H04N 1/6027 |
| 2017/0061590 | A1* | 3/2017 | Chamaret ............... G06T 5/007 |
| 2017/0061592 | A1* | 3/2017 | Reinhard ................. G06T 5/008 |

OTHER PUBLICATIONS

Banterle et al., "Expanding Low Dynamic Range Videos for High Dynamic Range Applications", ACM Spring Conference on Computer Graphics, Budmerice, Slovakia, Apr. 21, 2008, pp. 1-8.
Banterle et al., "High Dynamic Range Imaging and Low Dynamic Range Expansion for Generating HDR Content", Computer Graphics Forum, vol. 28, No. 8, Dec. 2009, pp. 2343-2367.
Huo et al., "Dodging and Burning Inspired Inverse Tone Mapping Algorithm", Journal of Computational Information Systems, vol. 9, No. 9, May 2013, pp. 3461-3468.
Masia et al., "Selective Reverse Tone Mapping", Congreso Español de Informatica Grafica, Eurographics, Valencia, Spain, Sep. 7, 2010, pp. 1-10.
Akyuz et al., "Do HDR displays support LDR content? A Psychophysical Evaluation", 34th International Conference and Exhibition on Computer Graphics and Interactive Techniques, SIGGRAPH 2007, San Diego, California, USA, Aug. 7, 2007, pp. 1-7.
Allred et al., "Lightness perception in high dynamic range images: Local and remote luminance effects", Journal of Vision, vol. 12, No. 2, Feb. 8, 2012, pp. 1-16.
Banterle et al., "A Psychophysical Evaluation of Inverse Tone Mapping Techniques", Computer Graphics Forum, vol. 28, No. 1, Mar. 2009, pp. 13-25.
Chen et al., "Real-time Edge-Aware Image Processing with the Bilateral Grid", ACM Transactions on Graphics (TOG)—Proceedings of ACM SIGGRAPH 2007, vol. 26, No. 3, Jul. 2007, pp. 1-9.
Cotsaces et al., "Video Shot Detection and Condensed Representation", IEEE Signal Processing Magazine, vol. 23, No. 2, Mar. 2006, pp. 28-37.
Didyk et al., "Enhancement of Bright Video Features for HDR Displays", Proceedings of the Nineteenth Eurographics Symposium on Rendering, vol. 27, No. 4, Jun. 2008, pp. 1265-1274.
Kiser et al., "Real-Time Automated Tone Mapping System for HDR Video", IEEE International Conference on Image Processing, Orlando, Florida, USA, Sep. 30, 2012, pp. 1-4.
Kovaleski et al., "High-quality brightness enhancement functions for real-time reverse tone mapping", The Visual Computer: International Journal of Computer Graphics, vol. 25, No. 5, Mar. 11, 2009, pp. 539-547.
Masia et al., "Evaluation of Reverse Tone Mapping Through Varying Exposure Conditions", ACM Transactions on Graphics(TOG), vol. 28, No. 5, Article No. 160, Dec. 2009, pp. 1-8.
Meylan et al., "High Dynamic Range Image Rendering With a Retinex-Based Adaptive Filter", IEEE Transactions on Image Processing, vol. 15, No. 9, Sep. 2006, pp. 2820-2830.
Meylan et al., "Tone Mapping for High Dynamic Range Displays", Proceedings of IS&T/SPIE Electronic Imaging: Human Vision and Electronic Imaging XII, vol. 6492, Feb. 12, 2007, pp. 1-12.
Rempel et al., "Ldr2Hdr: On-the-fly Reverse Tone Mapping of Legacy Video and Photographs", ACM Transactions Graphics on (TOG), vol. 26, No. 3, Article No. 39, Jul. 2007, pp. 1-6.
Seetzen et al., "High Dynamic Range Display Systems", ACM Transactions on Graphics (TOG), vol. 23, No. 3, Aug. 2004, pp. 1-9.
Seetzen et al., "P.54.2: A High Dynamic Range Display Using Low and High Resolution Modulators", Society for Information Display Symposium Digest of Technical Papers, vol. 34, No. 1, May 2003, pp. 1-4.
Tocci et al., "A Versatile HDR Video Production System"—ACM Transactions on Graphics (TOG), vol. 30, No. 4, Article No. 41, Jul. 2011, pp. 1-9.
Tomasi et al., "Bilateral Filtering for Gray and Color Images", ICCV '98 Proceedings of the IEEE Sixth International Conference on Computer Vision, Bombay, India, Jan. 4 1998, pp. 839-846.
Treil et al., "Image Wavelet Decomposition and Applications", University of Pennsylvania, Technical Reports & Information Science, http://repository.upenn.edu/cis_reports/781, Apr. 1989, pp. 1-45.

* cited by examiner

METHOD FOR INVERSE TONE MAPPING OF AN IMAGE

This application claims the benefit, under 35 U.S.C. § 365 of International Application of PCT/EP14/076183, filed Dec. 2, 2014, which was published in accordance with PCT Article 21(2) on Jul. 2, 2015, in English, and which claims the benefit of European patent application No. 13306876.7, filed Dec. 27, 2013.

TECHNICAL FIELD

The invention pertains to the field of high dynamic range imaging and addresses notably the problem of expanding the dynamic range of low dynamic range content to prepare such content for display devices having notably high peak luminance.

BACKGROUND ART

Recent advancements in display technology are beginning to allow for an extended range of color, luminance and contrast to be displayed.

Technologies allowing for extensions in luminance or brightness range of image content are known as high dynamic range imaging, often shortened to HDR. HDR technologies focus on capturing, processing and displaying content of a wider dynamic range.

Although a number of HDR display devices have appeared, and image cameras capable of capturing images with an increased dynamic range are being developed, there is still very limited HDR content available. While recent developments promise native capture of HDR content in the near future, they do not address existing content.

To prepare conventional (hereon referred to as LDR for low dynamic range) content for HDR display devices, reverse or inverse tone mapping operators (iTMO) can be employed. Such algorithms process the luminance information of colors in the image content with the aim of recovering or recreating the appearance of the original scene. Typically, iTMOs take a conventional (i.e. LDR) image as input, expand the luminance range of the colors of this image in a global manner, and subsequently process highlights or bright regions locally to enhance the HDR appearance of colors in the image.

Although several iTMO solutions exist, they focus at perceptually reproducing the appearance of the original scene and rely on strict assumptions about the content. Additionally, most expansion methods proposed in the literature are optimized towards extreme increases in dynamic range.

Typically, HDR imaging is defined by an extension in dynamic range between dark and bright values of luminance of colors combined with an increase in the number of quantization steps. To achieve more extreme increases in dynamic range, many methods combine a global expansion with local processing steps that enhance the appearance of highlights and other bright regions of images. Known global expansion steps proposed in the literature vary from inverse sigmoid, to linear or piecewise linear.

To enhance bright local features in an image, it is known to create an luminance expansion map, wherein each pixel of the image is associated with an expansion value to apply to the luminance of this pixel. In the simplest case, clipped regions in the image can be detected and then expanded using a steeper expansion curve, however such a solution does not offer sufficient control over the appearance of the image.

There is a need for a novel iTMO, which aims to enhance the visual appeal of images by selectively and dynamically remapping the luminance of their colors and their contrast range.

SUMMARY OF INVENTION

It is an object of the invention to enhance the visual appeal of images by selectively and dynamically remapping the luminance of their colors and their contrast range. Basically, it is considered that different luminance processing is necessary for different parts of the image. When no scene-referred data is available in the context of display side dynamic range expansion, any luminance expansion solution needs to be a trade-off between reproducing the appearance of the original scene as well as possible, while ensuring that compression artifacts or noise do not become amplified. Therefore, in the method of inverse tone mapping of an image as proposed below, the range expansion is spatially varying and therefore completely adapted to the image content.

A subject of the invention is therefore a method for inverse tone mapping of an image, the colors of which are represented in a color space separating luminance from chrominance, comprising:

- obtaining a pixel expansion exponent value $E'(p)$ for each pixel (p) of said image, by low pass filtering luminance values of colors of pixels in the spatial neighborhood of said pixel,
- obtaining a pixel luminance-enhancement value $Y_{enhance}(p)$ for each pixel (p) of said image, by extraction of high frequencies of luminance values of colors of pixels in the spatial neighborhood of said pixel,
- inverse tone mapping the luminance $Y(p)$ of each pixel (p) of said image into an expanded luminance $Y_{exp}(p)$ obtained through the product of the luminance $Y(p)$ of said pixel at the power of the pixel expansion exponent value $E'(p)$ obtained for this pixel and of the pixel luminance-enhancement value obtained for said pixel at the power of an exponent parameter c, which is superior or equal to 1.

It means that $Y_{exp}(p) = Y(p)^{E'(p)} \times [Y_{enhance}(p)]^c$

The exponent parameter c controls the amount of detail enhancement brought by pixel luminance-enhancement value. Therefore, larger values of c gradually increase the contrast of image edges. A value of c=1.5 is preferably used.

As the low pass filtering of luminance values is performed in the spatial neighborhood of a pixel to obtain its pixel expansion exponent value, it means that each pixel will get its own expansion exponent. Therefore, the expansion of luminance range obtained by this method is spatially varying and adapted to the image content.

As the extraction of high frequencies of luminance values is performed in the spatial neighborhood of a pixel to obtain its pixel luminance-enhancement value, it means that each pixel will get its own enhancement of luminance and such an enhancement of luminance will be advantageously adapted to compensate at least partially the smoothing of details of the image that is caused by the spatial component of the low pass filtering of luminance values performed to expand the luminance.

Preferably, the low pass filtering is performed such that the colors of pixels within bright areas of the image are enhanced more than the colors of pixels within darker areas of this image.

Preferably, said pixel expansion exponent values E'(p) are also obtained by reshaping said low-pass filtered luminance values such that these values are redistributed such that the mean expanded luminance of the image that is obtained is approximately equal to the mean luminance of the original image.

In a first variant, if the inverse tone mapped image is intended to be reproduced on a display device having a given peak luminance $D_{max}$, said pixel expansion exponent values E'(p) are also preferably obtained by rescaling said low-pass filtered luminance values such that the maximum luminance max(Y) over pixels of said image at the power of the pixel expansion exponent value obtained for the pixel having this maximum luminance max(Y) is equal to said peak luminance $D_{max}$.

It means for instance that $$E'(p) = \left(\alpha \frac{E(p)}{\max(E)} + 1 - \alpha\right) \frac{\log(D_{max})}{\log(\max(Y))},$$

where E(p) is the value obtained directly by low pass filtering of luminance values of colors of the pixel (p) in the spatial neighborhood of this pixel, where α is a rescaling parameter which can be used to control the overall expansion of luminance. Therefore, with the term $D_{max}$, the luminance processing of the image depends on the capabilities of the HDR display device used to display this image, notably its peak luminance.

The method adapts then advantageously both to the content itself and to the luminance range of the display device, and allows the enhancement of the HDR appearance of content, even with display devices when modest increases in dynamic range are used.

In a second variant, said pixel expansion exponent values E'(p) are preferably obtained by reshaping said low-pass filtered luminance values through a quadratic function applied to these values.

Preferably, for computing the pixel expansion exponent value of each pixel, said low pass filtering is performed in a first variant by computing the product of a first Gaussian function applied in said spatial neighborhood of said pixel and of a second Gaussian function applied in the neighborhood of the luminance value of the color of said pixel.

It means that the filtering is performed using a first Gaussian function applied on the spatial domain of the image and a second Gaussian function applied on the luminance range domain.

Preferably, the value of the standard deviation $\sigma_s$ of the first Gaussian function is superior or equal to 3.

The value of the standard deviation $\sigma_r$ of the second Gaussian function should be preferably high enough to smooth texture and noise, but low enough to avoid crossing edges between objects of the image. The value of the standard deviation $\sigma_r$ is chosen preferably between 0.1 max(Y) and 0.5 max(Y), where max(Y) is the maximum luminance over all pixels of the original image.

Preferably, for computing pixel luminance-enhancement values, said extraction of high frequencies of luminance values is performed by computing a ratio of a second low pass filtering divided by a third low pass filtering, wherein the third low pass filtering is configured to remove more details in the image than the second low pass filtering.

Preferably, for computing the pixel luminance-enhancement value of a pixel, said second low pass filtering is performed by computing the product of a third Gaussian function applied in the neighborhood of said pixel with a first standard deviation and of a fourth Gaussian function applied in the neighborhood of the luminance of the color of said pixel, and said third low pass filtering is obtained by applying a second time said second low pass filtering with a second standard deviation higher than said first standard deviation for the third Gaussian function.

By using higher value of the standard deviation of the third Gaussian function when applying a second time said second low pass filtering, the third low pass filtering removes more details in the image than the second low pass filtering. Therefore, the obtained ratio corresponds to a high-pass filtering.

Preferably, the luminance of said colors being encoded into increasing levels of wavelet decomposition, each level having at least a high-frequency coefficient (LH) and a low-frequency coefficient (LL), the pixel expansion exponent value of each pixel is computed in a second variant as being equal to the low-frequency coefficient A(p)=LL of the highest level encoding the luminance of the color of said pixel (p), then performing said low pass filtering in said spatial neighborhood of said pixel.

Preferably, for said computing of the pixel luminance-enhancement value of a pixel, said extraction of high frequencies of luminance values of pixels located in the neighborhood of said pixel is performed by computing a difference between the luminance Y(p) of said pixel and said low-frequency coefficient A(p) of said pixel.

Thus, only the high frequencies removed from the lowest frequency subband of the (highest) level of the wavelet decomposition of the luminance are kept for the enhancement of details of the image.

Preferably, said computing comprises the application of an exponent coefficient to this difference. This exponent coefficient is preferably equal to 2.

A subject of the invention is also an image processing device for the inverse tone mapping of an image, the colors of which are represented in a color space separating luminance from chrominance, comprises:

- a low pass filtering module configured for obtaining a pixel expansion exponent value for each pixel of this image, by low pass filtering luminance values of colors of pixels in the spatial neighborhood of this pixel,
- a reshaping/rescaling module configured for reshaping/rescaling the low pass filtered luminance values provided by the low pass filtering module,
- a high frequencies extraction module configured for obtaining a pixel luminance-enhancement value for each pixel of the image, by extraction of high frequencies of luminance values of colors of pixels in the luminance neighborhood of this pixel,
- an inverse tone mapping module configured for inverse tone mapping the luminance of each pixel of the image into an expanded luminance obtained through the product of the luminance of said pixel at the power of the pixel expansion exponent value provided for this pixel by the reshaping/rescaling module and of the pixel luminance-enhancement value provided for said pixel by the high frequencies extraction module at the power of an exponent parameter c which is superior or equal to 1.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The functions of the various elements shown in the figures may be provided through the use of dedicated hardware as well as hardware capable of executing software in association with appropriate software.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The invention may be notably implemented as a combination of hardware and software. Moreover, the software may be implemented as an application program tangibly embodied on a program storage unit. Such a software can take the form of a plug-in to be integrated to another software. The application program may be uploaded to, and executed by, an image processing device comprising any suitable architecture. Preferably, the image processing device is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit, a display device, a printing unit, . . . . The image processing device implementing the embodiment of the method according to the invention may be part of any electronic device able to receive images, for instance a TV set, a set-top-box, a gateway, a cell phone, a tablet.

This image processing device for the inverse tone mapping of an image, the colors of which are represented in a color space separating luminance from chrominance, comprises:
- a low pass filtering module configured for obtaining a pixel expansion exponent value for each pixel of this image, by low pass filtering luminance values of colors of pixels in the spatial neighborhood of this pixel,
- a reshaping/rescaling module configured for reshaping/rescaling the low pass filtered luminance values provided by the low pass filtering module,
- a high frequencies extraction module configured for obtaining a pixel luminance-enhancement value for each pixel of the image, by extraction of high frequencies of luminance values of colors of pixels in the spatial neighborhood of this pixel,
- an inverse tone mapping module configured for inverse tone mapping the luminance of each pixel of the image into an expanded luminance obtained through the product of the luminance of said pixel at the power of the pixel expansion exponent value provided for this pixel by the reshaping/rescaling module and of the pixel luminance-enhancement value provided for said pixel by the high frequencies extraction module at the power of an exponent parameter c, where c is superior or equal to 1.

A first embodiment of the method for the inverse tone mapping of an image will now be described in reference to FIG. 1, using the image processing device as described above.

Using for instance an image receiver, an image is received with all data related to colors of each pixel, wherein the color associated with each pixel of this image is encoded into three color coordinates, i.e. one color coordinate for each color channel, R, G and B.

In a first preparation step of this embodiment (not shown on FIG. 1), the received RGB color coordinates of these colors are, if needed, normalized and optionally linearized in a manner known per se, such that the colors of the received image are represented in the RGB color space of a display device. This RGB color space can be standardized, and the corresponding display device is a virtual one. Then, these colors are converted to a color space separating luminance from chrominance, for instance the YUV color space. This conversion of colors from the RGB color space into the YUV color space is known per se and therefore not described in detail. Any other color space separating luminance from chrominance can be used instead, as XYZ, Yxy, CIE Lab. Therefore, a luminance value $Y(p)$ and two chrominance values $U(p)$, $V(p)$ are associated with the color of any pixel p of the received image. An aim of the embodiment of the method of inverse tone mapping that will be described is to expand these luminance values into expanded luminance values by applying an exponent value $E'(p)$ to each of these luminance values $Y(p)$.

Using the low pass filtering module, in a second step of this embodiment, for each pixel p of the image having its luminance value $Y(p)$, an intermediate pixel expansion exponent value $E(p)$ is obtained, by low pass filtering luminance values of pixels in a spatial neighborhood of the pixel p, and optionally also in a neighborhood of the luminance value $Y(p)$. This low pass filtering step preferably uses Gaussian functions. $E(p)$ is for instance obtained through the following equation:

$$E(p) = \sum_{i \in \Omega} Y(p_i) f_s(\|p_i - p\|) f_r(\|Y(p_i) - Y(p)\|)$$

where $f_s$ is first a Gaussian function applied on the spatial domain of the image, and $f_r$ a second Gaussian function applied on the luminance range domain, where $\Omega$ is the size of a window of the image centered at the pixel p, where $p_i$ is a pixel in this window. The window size can be for instance 5 or 7. Smaller values of window size are preferred for computational efficiency.

In this first embodiment of the method according to the invention, the low pass filtering is then bilateral. The word "bilateral" refers to the fact that the filtering is performed here both in spatial and luminance range domains.

Preferably, the value of the standard deviation $\sigma_s$ of the first Gaussian function $f_s$ is superior or equal to 2.

The value of the standard deviation $\sigma_r$ of the second Gaussian function $f_r$ should be preferably high enough to smooth texture and noise in the original image, but low enough to avoid crossing edges between objects of this image. The value of the standard deviation $\sigma_r$ is chosen preferably between 0.1 max(Y) and 0.5 max(Y), where max(Y) is the maximum luminance value over all pixels of the original image.

In a specific implementation of this first embodiment, the standard deviation for the spatial Gaussian function $f_s$ was set at $\sigma_s=3$, and the standard deviation for the luminance range Gaussian function $f_r$ was set at $\sigma_r=0.3 \times \max(Y)$.

All intermediate pixel expansion exponent values that are obtained through this low pass filtering form then an intermediate expansion exponent map $E(p)$.

Using the reshaping/rescaling module, in a third step of this embodiment, the intermediate expansion exponent map is reshaped into a final expansion exponent map by using a sigmoidal function that depends on the distribution of pixel expansion exponent values over the image and/or rescaled based on the peak luminance of the display device that will be used to reproduce the expanded image.

Although the pixel expansion exponent values as calculated above indicate the per-pixel expansions at a relative scale, these expansion values need to be rescaled such that they conform to a set of constraints. Despite the increased abilities of HDR display devices that could be used to reproduce the HDR images provided by the inverse tone mapping method, the mean luminance in the expanded HDR image that is obtained by this method should preferably maintain to levels comparable to that of the original LDR image. At the same time, the expansion of luminance should take into account the peak luminance Dmax of the display device that will be used to reproduce the expanded HDR image, so as to expand highlights appropriately. Therefore, through this third step, a reshaped/rescaled pixel expansion exponent value $E'(p)$ is obtained through the following equation:

$$E'(p) = \left(\alpha \frac{E(p)}{\max(E)} + 1 - \alpha\right) \frac{\log(D_{max})}{\log(\max(Y))}$$

where the parameter $\alpha$ can be used to control the overall behavior of the luminance expansion, where $E(p)$ is the intermediate pixel expansion exponent value as calculated at the second step above, where max(E) is the maximum value of $E(p)$ over all pixels of the image, where the term $$\frac{\log(D_{max})}{\log(\max(Y))}$$

allows to have $Y(p)^{E'(p)}=D_{max}$ when $Y(p)=\max(Y)$.

The purpose of the parameter $\alpha$ is to control how 'flat' the luminance expansion is. It is a weight balancing between the spatially varying expansion and a constant exponent. Higher values for $\alpha$ mean that the luminance expansion is more local, therefore leading to a more extreme result, while lower values for $\alpha$ lead to an expansion closer to global. The value $\alpha=0.1$ has actually offered a good trade-off between highlight expansion and effective management of midtones.

In a specific implementation of this first embodiment, the parameter $\alpha$ was set at a value $\alpha=0.1$, because this value offers a good trade-off between highlight expansion and effective management of midtones.

All reshaped/rescaled pixel expansion exponent values form then a final expansion exponent map $E'(p)$.

Using the high frequencies extraction module, in a fourth step of this embodiment, high spatial frequencies of luminance values in the original image are extracted to obtain a pixel luminance-enhancement value $Y_{enhance}(p)$ for each pixel p of the image having its luminance value $Y(p)$. This step is for instance performed through three substeps, as follows.

In a first substep of filtering, a base layer $Y_{base}$ is computed as follows, that contains large variations in luminance of the image but excludes noise or other small features:

$$Y_{base}(p) = \sum_{i \in \Omega'} Y(p_i) f'_s(\|p_i - p\|) f'_r(\|Y(p_i) - Y(p)\|)$$

using the same Gaussian functions $f'_s$, $f'_r$ as above, first in a spatial neighborhood of the pixel p, and second in a neighborhood of the luminance value $Y(p)$, where $\Omega'$ is the size of a window of the image centered at the pixel p, having preferably the same size as above, and where $p_i$ is a pixel in this window.

In this specific implementation of this first embodiment, the standard deviation for the spatial Gaussian function $f'_s$ is now set at $\sigma'_s=10$, and the standard deviation for the luminance range Gaussian function $f'_r$ is set at $\sigma'_r=0.1 \times \max(Y)$.

In a second substep of filtering, the base layer $Y_{base}$ obtained by the first substep is filtered a second time using Gaussian functions too, but with a larger standard deviation in the luminance range in order to remove more luminance details in the image, obtaining $Y'_{base}$ as follows:

$$Y'_{base}(p) = \sum_{i \in \Omega''} Y(p_i) f''_s(\|p_i - p\|) f''_r(\|Y(p_i) - Y(p)\|)$$

where $f'_s$, $f'_r$ are the same Gaussian functions as above, first in a spatial neighborhood of the pixel p, and second in a neighborhood of the luminance value $Y(p)$, where $\Omega''$ is the size of a window of the image centered at the pixel p having preferably the same size as above, where $p_i$ is a pixel in this window.

Optionally, $Y'_{base}(p)$ can be set equal to $E(p)$ as defined above in order to minimize noise in the final HDR image.

In a specific implementation of this first embodiment, the standard deviation for the spatial Gaussian function $f'_s$ is now set such that $\sigma''_s=\sigma'_s$ and the standard deviation for the luminance range Gaussian function $f''_r$ is set such as to remove more luminance details in the image, i.e. such that $\sigma''_r > \sigma'_r$. For instance $\sigma''_r=0.3 \times \max(Y)$.

In a third and final substep of extraction of high frequencies of luminance values in the image, for each pixel of the image, a pixel luminance-enhancement value $Y_{enhance}(p)$ is computed as the ratio of the result $Y_{base}(p)$ of the first substep divided by the result $Y'_{base}(p)$ of the second substep, such that $Y_{enhance}(p)=Y_{base}(p)/Y'_{base}(p)$. As $\sigma''_r > \sigma'_r$, this ratio correspond to an extraction of high spatial frequencies of luminance values in the image. Other ways of extraction of high spatial frequencies of luminance values in the image can be used without departing from the invention.

All final pixel luminance-enhancement values form then a luminance-enhancement map, that, when applied to the luminance values of the image, will enhance its details, because of the extraction of high frequencies of luminance values.

Using the inverse tone mapping module, in a fifth step of this embodiment, the luminance Y(p) of each pixel p of the image is inverse tone mapped into an expanded luminance $Y_{exp}(p)$ obtained through the product of the luminance of this pixel at the power of the final pixel expansion exponent value E'(p) obtained for this pixel from the third step above and of the pixel luminance-enhancement value obtained for this pixel from the fourth step above at the power of an exponent parameter c, where c is superior or equal to 1. It means that $Y_{exp}(p) = Y(p)^{E'(p)} \times [Y_{enhance}(p)]^c$.

The exponent parameter c controls the amount of detail enhancement brought by pixel luminance-enhancement value. Therefore, larger values of c gradually increase the contrast of image edges. A value of c=1.5 is preferably used.

When expanding the luminance of an image as described above, luminance and contrast changes can affect the appearance of color and saturation in the image. While expanding its luminance range, color information of the image may be managed in a sixth optional step to preserve the artistic intent of the image. Preferably, saturations of colors are enhanced using the expansion exponent values as a guide. More specifically, the saturation of the color of each pixel is enhanced by a factor equal to the expansion exponent of this pixel. Saturation of the color of a pixel p is for instance enhanced by adjusting a Chroma value C(p) of this pixel, computed as follows in a cylindrical version of the YUV space:

$$C(p) = \sqrt{U(p)^2 + V(p)^2}$$

and the adjusted Chroma value C'(p) is computed as the product of expansion exponent E'(p) of this pixel p by the Chroma value C(p) of this pixel, such that:

$$C'(p) = E'(p) \times C(p)$$

In the specific implementation of this first embodiment, the Chroma scaling which transforms C(p) into C'(p) is preferably limited to a factor of 1.5 to avoid over-saturating highlights, e.g. to avoid light explosions and bright lights.

With these new values of C'(p), new values of chrominance U'(p), V'(p) are calculated, using a usual way of conversion from a cylindrical color space such as LCH here, toward a YUV space:

$$U'(p) = \cos[H(p)] \times C'(p)$$

$$V'(p) = \sin[(H(p)] \times C'(p)$$

Where H(p) is the original hue computed from original U(p) and V(p) as follows:

$$H(p) = \arctan[V(p), U(p)].$$

At the end of the fifth or sixth step, the YUV coordinates of each color of the image are then mapped into new Y'U'V' coordinates representing expanded colors in the YUV color space.

In a final seventh step of this first embodiment (not shown on FIG. 1), the new Y'U'V' coordinates of expanded colors are converted back in a manner known per se into corresponding new R'G'B' coordinates representing the same expanded colors in the RGB color space. If needed, these R'G'B' coordinates are delinearized such as to represent expanded colors in the color space in which colors were received at the first step above.

Figure 1:
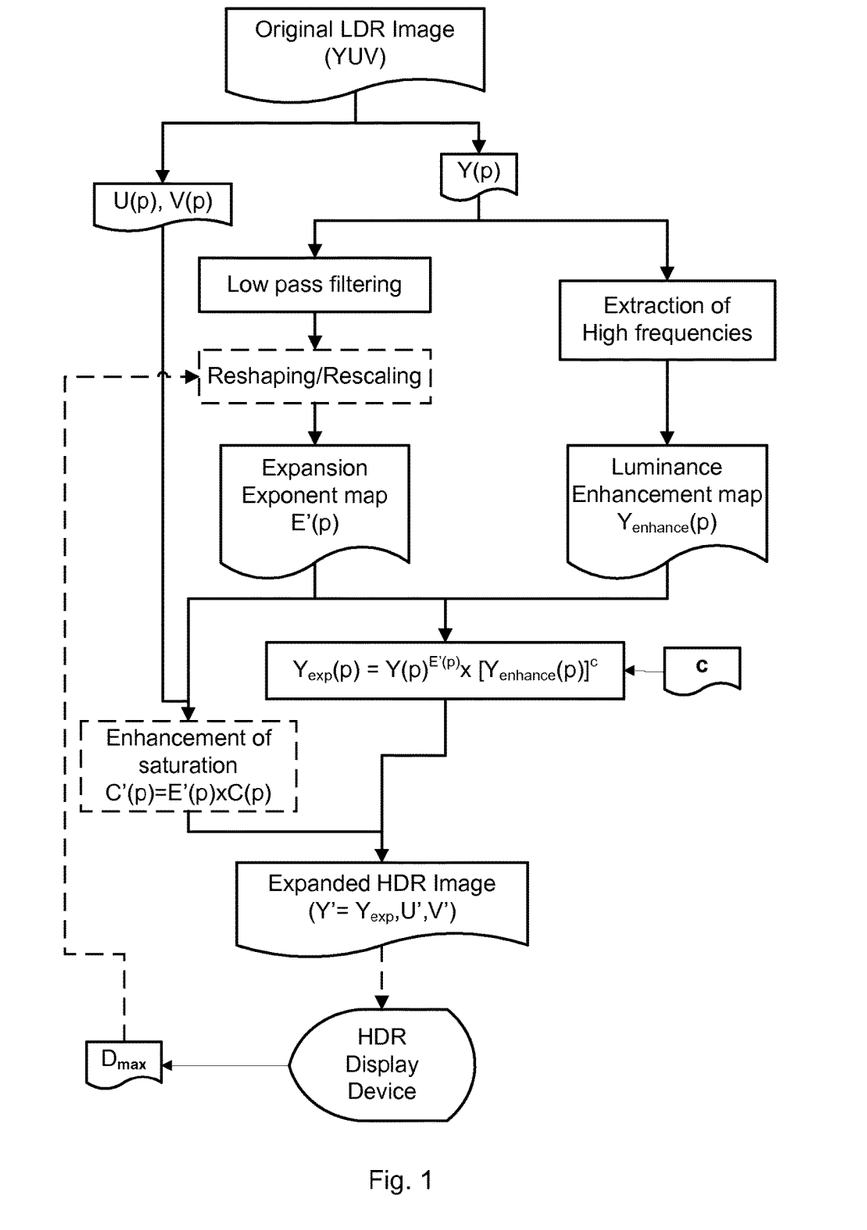
FIG. 1 illustrates the different steps according to a first and second embodiment of the invention.

As shown on FIG. 1, the expanded image based on these expanded colors is now ready to be sent to the display device having its peak luminance Dmax, in order to be reproduced within a high dynamic range.

Advantages

The expanded images that are obtained through the method according to the invention are as close as possible to what an HDR image of the same scene would look like. The obtained expanded content is of higher visual quality compared to the LDR input images, even in cases where only modest expansion can be applied. This luminance expansion method enhances bright image features, conveys the appearance of light sources and highlights to the viewer, while preserving midrange values. Depending on the luminance range of the display device used to reproduce these expanded images, dark values may be preserved or further compressed to enhance global contrast in the image.

The method according to the invention uses a low pass filtering process in the spatial domain to define expansion exponent values that are used to expand luminance of colors. This low pass filtering process smooths some details of the image. Advantageously, this removal of details is compensated by the extraction, in the spatial domain, of high spatial frequencies used for to obtain the luminance enhancement factor applied to the expanded luminance. In other words, the spatial component of the high pass filtering of luminance values is performed such as to compensate at least partially the smoothing of details of the image that is caused by the spatial component of the low pass filtering of luminance values.

Using the bilateral low pass filter on the luminance as described above, an expansion map is obtained that favors bright regions of the image, while smoothing small local detail, such as noise or banding artefacts. This allows to expand the bright regions but without amplifying noise or texture information.

As a matter of fact, one of the limitations of most current HDR LCD display devices is that the spatially-varying backlight of these devices has a relatively low resolution compared to the front LCD panel of these devices. Consequently, although such HDR display devices can achieve very high global contrasts, locally, contrast suffers. This is particularly visible in small, high contrast areas of images, such as highlights, or in sharp transitions between dark and bright regions. Although many solutions are available for enhancing contrast in images, in the context of inverse tone mapping, special care is required to ensure that noise or other artifacts are not enhanced as well. The two-pass bilateral filtering process described above to extract the high spatial frequency of the image is particularly well adapted to enhance contrast without enhancing noise and artifacts.

When the pixel expansion exponent value E(p) is reshaped as described above into a reshaped value E'(p), the expanded image that is obtained best takes advantage of the available dynamic range of the display device used to reproduce the image.

$1^{st}$ Variant of the First Embodiment

For the inverse tone mapping of a sequence of images, i.e. a video content, the embodiment of the method as described above is applied sequentially, one image of the sequence after the other. If this method is applied independently to each successive image of the sequence, it may be difficult to guarantee temporal coherence between the expanded images of the HDR sequence that is obtained. As a matter of fact, if bright objects in the scene move, flickering artifacts may be created. To avoid this issue, a simple temporal processing is preferably applied by ensuring the mean luminance of the expanded footage remains constant. For an image i of the sequence for which an expanded luminance value $Y'_{exp,i}$ has been obtained as described in the first embodiment above, an adjusted expanded luminance value $Y''_{exp,i}$ is calculated as follows and used instead of $Y'_{exp,i}$ for the expanded image:

$$Y''_{exp,i} = \frac{\mu(Y'_{exp,i-1})Y'_{exp,i}}{\mu(Y'_{exp})}$$

To ensure that strong features in one scene are not propagated to next scenes, the mean is reset at the beginning of every shot. This can be achieved by employing existing shot detection algorithms.

$2^{nd}$ Variant of the First Embodiment

This second variant concerns the calculation of the reshaped/rescaled pixel expansion exponent values E'(p) from the intermediate pixel expansion exponent value E(p) as obtained at the second step of the above embodiment. It is now proposed to reshape the pixel expansion exponent values according to a quadratic function of the intermediate pixel expansion exponent value E(p), according to the equation:

$$E'(p)=a[E(p)]^2+bE(p)+c.$$

Note that, in this equation, E(p) is not scaled by max(E(p)) as in the previous equation.

In a first example, the parameters a, b, c in the above equation can be set as constants and optimized for a specific display device.

In a second example, the parameters a, b, c in the above equation can be computed depending on $D_{max}$. The following equations are for instance used to compute the values of the parameters a, b and c:

$$a=p_{a1}\exp(p_{a2}D_{max})+p_{a3}\exp(p_{a4}D_{max}) \quad (s\text{-}1)$$

$$b=p_{b1}D_{max}{}^{p_{b2}}+p_{b3} \quad (s\text{-}2)$$

$$c=1.3 \quad (s\text{-}3)$$

Example of values given to the constants for Eq. (s-1) and (s-2) are shown in Table 1.

TABLE 1

| Parameters for Eq. s-1 | | Parameters for Eq. s-2 | |
|---|---|---|---|
| $P_{a1}$ | −8.192e-7 | $P_{b1}$ | 0.05941 |
| $P_{a2}$ | 0.000312 | $P_{b2}$ | 0.03135 |
| $P_{a3}$ | 1.657e-5 | $P_{b3}$ | −0.07579 |
| $P_{a4}$ | −0.0006967 | | |

In a third example, the value of the parameters a, b, c depends on the value of the pixel expansion exponent value E(p) itself, in order to be different for the dark values of E(p) and for the bright values of E(p) to better control shadows and highlights of the image obtained after expansion.

All reshaped/rescaled pixel expansion exponent values according to this variant form then a final expansion exponent map E'(p) that replaces the previous one.

A second embodiment of the method for the inverse tone mapping of an image will now be disclosed, using an image processing device as described above, but configured specifically to implement this embodiment.

When compared to the first embodiment, the only differences concern:

- the second step of obtaining, for each pixel p, a pixel expansion exponent value E(p) by low pass filtering the luminance values of pixels in a spatial neighborhood of the pixel p,
- the fourth step of extracting high spatial frequencies to obtain a pixel luminance-enhancement value $Y_{enhance}$(p) for each pixel p of the image.

In this second embodiment, the colors are received as sets of three color coordinates representing these colors in a color space separating luminance from chrominance, for instance the YUV color space. Again, any other color space separating luminance from chrominance can be used instead. Therefore, a luminance value Y(p) and two chrominance values U(p), V(p) are associated to the color of any pixel p of the image.

Figure 2:
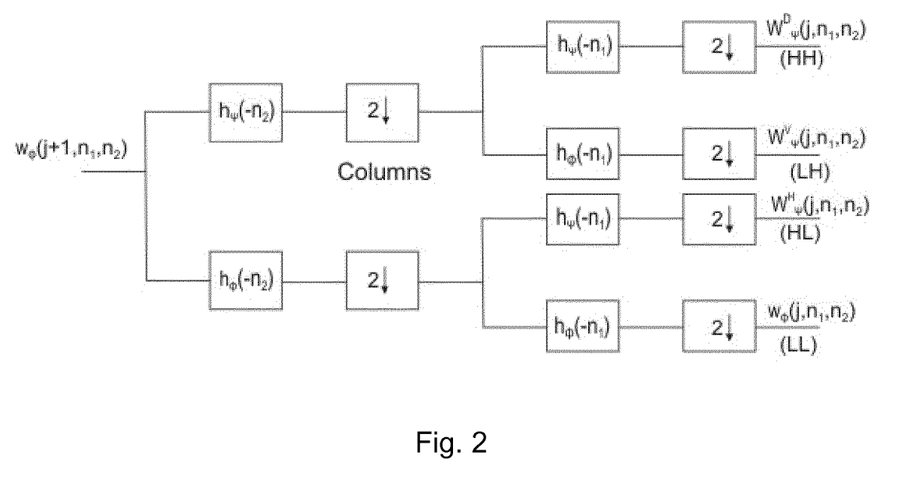
FIG. 2 illustrates a wavelet decomposition of the YUV coordinates of colors of an image to be inverse-tone mapped.
Figure 3:
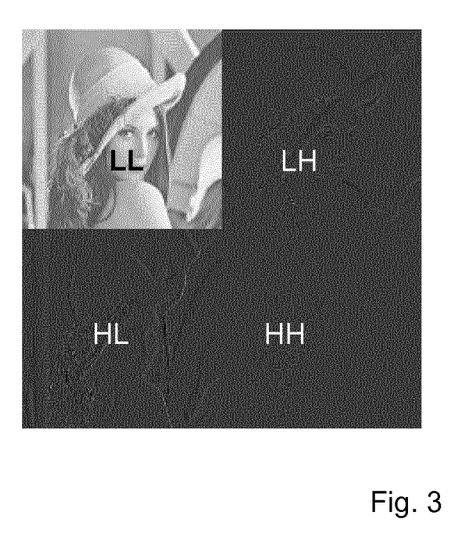
FIG. 3 illustrates a wavelet decomposition of this image.

More specifically, these sets of three color coordinates are received under a compressed format, of the type of wavelet compression. Therefore, the luminance Y(p) of colors are encoded into increasing levels of wavelet decomposition, each level having at least a high-frequency coefficient LH and a low-frequency coefficient LL, as described for instance at FIG. 2, where the LL, LH, HL and HH subband partitions indicate the approximated image and the images with horizontal edges, vertical edges and diagonal edges respectively, such as depicted in FIG. 3.

To create the pixel expansion exponent map and the pixel luminance enhancement map, only one level of wavelet decomposition is used in this embodiment.

To implement the second step of the method, the so-called Haar lifting wavelet implementation is used, and the pixel expansion exponent value E(p) of a pixel p is obtained from the LL subband. The $h_\psi(n)=\{1/\sqrt{2};1/\sqrt{2}\}$ and $h_\phi(n)=\{1/\sqrt{2};-1/\sqrt{2}\}$ are the convolution filters.

Therefore, it means that, in the second step of this embodiment, the pixel expansion exponent value of each pixel is computed as being equal to the low-frequency coefficient A(p)=LL of the highest level encoding the luminance of the color of this pixel p, then performing a low pass filtering in the spatial neighborhood of this pixel.

To implement the fourth step of the method, the extraction of high frequencies of luminances in the spatial domain is performed by computing a difference between the luminance Y(p) of a pixel p and the low-frequency coefficient A(p) of this pixel. More precisely, the LL subband which is a low frequency version A(p) of the original luminance Y(p) at a resolution divided by 4, is upsampled and then subtracted from this original luminance Y(p) to get the pixel luminance enhancement value $Y_{enhance}$(p) as follows: $Y_{enhance}(p)=((Y(p)-cA(p)\uparrow 2)+128)/255*2$.

Thus, only the high frequencies removed from the LL subband are kept for creating the basis of the luminance enhancement map $Y_{enhance}$.

All other steps are similar to the steps described in the first embodiment. Of course, the final seventh step can be removed, as the new Y'U'V' coordinates of expanded colors that are obtained may not need to be converted into corresponding new R'G'B' coordinates.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in com-

The invention claimed is:

1. A method for inverse tone mapping of an image, the colors of which are represented in a color space separating luminance from chrominance, comprising:

obtaining a pixel expansion exponent value E'(p) for each pixel (p) of said image, by low pass filtering luminance values of colors of pixels in the spatial neighborhood of said pixel, obtaining a pixel luminance-enhancement value $Y_{enhance}(p)$ for each pixel (p) of said image, by extraction of high frequencies of luminance values of colors of pixels in the spatial neighborhood of said pixel, inverse tone mapping the luminance Y(p) of each pixel (p) of said image into an expanded luminance $Y_{exp}(p)$ obtained through the product of the luminance Y(p) of said pixel at the power of the pixel expansion exponent value E'(p) obtained for this pixel and of the pixel luminance-enhancement value obtained for said pixel at the power of an exponent parameter c, which is superior or equal to 1.

2. The method for the inverse tone mapping of an image according to claim 1, wherein said pixel expansion exponent values E'(p) are also obtained by reshaping said low-pass filtered luminance values such that these values are redistributed such that the mean expanded luminance of the image that is obtained is approximately equal to the mean luminance of the original image.

3. The method for the inverse tone mapping of an image according to claim 1 adapted to be reproduced on a display device having a given peak luminance $D_{max}$, wherein said pixel expansion exponent values E'(p) are also obtained by rescaling said low-pass filtered luminance values such that the maximum luminance max(Y) over pixels of said image at the power of the pixel expansion exponent value obtained for the pixel having this maximum luminance max(Y) is approximately equal to said peak luminance $D_{max}$.

4. The method for the inverse tone mapping of an image according to claim 1, wherein said pixel expansion exponent values E'(p) are obtained by reshaping said low-pass filtered luminance values through a quadratic function applied to these values.

5. The method for the inverse tone mapping of an image according to claim 1, wherein, for computing the pixel expansion exponent value of each pixel, said low pass filtering is performed by computing the product of a first Gaussian function applied in said spatial neighborhood of said pixel and of a second Gaussian function applied in the neighborhood of the luminance value of the color of said pixel.

6. The method for the inverse tone mapping of an image according to claim 5, wherein, for said computing pixel luminance-enhancement values, said extraction of high frequencies of luminance values is performed by computing a ratio of a second low pass filtering divided by a third low pass filtering, wherein the third low pass filtering is configured to remove more details in the image than the second low pass filtering.

7. The method for the inverse tone mapping of an image according to claim 1, wherein the luminance of said colors are encoded into increasing levels of wavelet decomposition, each level having at least a high-frequency coefficient (LH) and a low-frequency coefficient (LL), wherein the pixel expansion exponent value of each pixel is computed as be being equal to the low-frequency coefficient A(p)=LL of the highest level encoding the luminance of the color of said pixel (p), then performing said low pass filtering in said spatial neighborhood of said pixel.

8. The method for the inverse tone mapping of an image according to claim 7, wherein, for said computing of the pixel luminance-enhancement value of a pixel, said extraction of high frequencies of luminance values of pixels located in the neighborhood of said pixel is performed by computing a difference between the luminance Y(p) of said pixel and said low-frequency coefficient A(p) of said pixel.

9. An image processing device for the inverse tone mapping of an image, the colors of which are represented in a color space separating luminance from chrominance, comprising: a low pass filtering module configured for obtaining a pixel expansion exponent value for each pixel of this image, by low pass filtering luminance values of colors of pixels in the spatial neighborhood of this pixel, a reshaping/rescaling module configured for reshaping/rescaling the low pass filtered luminance values provided by the low pass filtering module, a high frequencies extraction module configured for obtaining a pixel luminance-enhancement value for each pixel of the image, by extraction of high frequencies of luminance values of colors of pixels in the luminance neighborhood of this pixel, an inverse tone mapping module configured for inverse tone mapping the luminance of each pixel of the image into an expanded luminance obtained through the product of the luminance of said pixel at the power of the pixel expansion exponent value provided for this pixel by the reshaping/rescaling module and of the pixel luminance-enhancement value provided for said pixel by the high frequencies extraction module at the power of an exponent parameter c which is superior or equal to 1.

10. An electronic device comprising the image processing device according to claim 9.

11. The electronic device according to claim 10 further comprising a display device having a given peak luminance $D_{max}$ and configured for displaying said inverse tone mapped image and a module configured for obtaining said pixel expansion exponent values E'(p) by rescaling said low-pass filtered luminance values such that the maximum luminance max(Y) over pixels of said image at the power of the pixel expansion exponent value obtained for the pixel having this maximum luminance max(Y) is approximately equal to said peak luminance $D_{max}$.

12. A non-transitory processor readable medium having stored thereon a computer program product at least one of readable by a computer and executable by a processor, said computer program product comprising program code instructions for inverse tone mapping of an image, the colors of which are represented in a color space separating luminance from chrominance comprising:

obtaining a pixel expansion exponent value E'(p) for each pixel (p) of said image, by low pass filtering luminance values of colors of pixels in the spatial neighborhood of said pixel, obtaining a pixel luminance-enhancement value $Y_{enhance}(p)$ for each pixel (p) of said image, by extraction of high frequencies of luminance values of colors of pixels in the spatial neighborhood of said pixel, and inverse tone mapping the luminance Y(p) of each pixel (p) of said image into an expanded luminance $Y_{exp}(p)$ obtained through the product of the luminance Y(p) of said pixel at the power of the pixel expansion exponent value E'(p) obtained for this pixel and of the pixel luminance-enhancement value obtained for said pixel at the power of an exponent parameter c, which is superior or equal to 1.

13. The image processing device of claim 9, wherein the reshaping/rescaling module is further configured for reshaping low pass filtered luminance values such that these values are redistributed such that the mean expanded luminance of the image that is obtained is approximately equal to the mean luminance of the original image.

14. The image processing device of claim 9, wherein the reshaping/rescaling module is further configured for rescaling low pass filtered luminance values such that the maximum luminance max(Y) over pixels of said image at the power of the pixel expansion exponent value obtained for the pixel having this maximum luminance max(Y) is approximately equal to a peak luminance $D_{max}$, wherein said peak luminance $D_{max}$ is the peak luminance of a display device for reproducing said inverse tone mapped image.

15. The image processing device of claim 9, wherein the reshaping/rescaling module is further configured for reshaping low pass filtered luminance values through a quadratic function applied to these values.

16. The image processing device of claim 9, wherein the low pass filtering module is further configured for obtaining a pixel expansion exponent value for a pixel by computing the product of a first Gaussian function applied in said spatial neighborhood of said pixel and of a second Gaussian function applied in the neighborhood of the luminance value of the color of said pixel.

17. The image processing device of claim 9, wherein the high frequencies extraction module is further configured for obtaining a pixel luminance-enhancement value of a pixel by computing a ratio of a second low pass filtering divided by a third low pass filtering, wherein the third low pass filtering is configured to remove more details in the image than the second low pass filtering.

18. The image processing device of claim 9, wherein the luminance of said colors being encoded into increasing levels of wavelet decomposition, each level having at least a high-frequency coefficient (LH) and a low-frequency coefficient (LL), wherein the low pass filtering module is further configured to compute the pixel expansion exponent value of a pixel such as to be equal to the low-frequency coefficient A(p)=LL of the highest level encoding the luminance of the color of said pixel (p).

19. The image processing device of claim 17, wherein the high frequencies extraction module is further configured for computing a difference between the luminance Y(p) of said pixel and said low-frequency coefficient A(p) of said pixel.

* * * * *